United States Patent [19]

Wulff et al.

[11] Patent Number: 5,007,761
[45] Date of Patent: Apr. 16, 1991

[54] SEAL ARRANGEMENT FOR CONNECTING SEALS

[75] Inventors: Dietrich Wulff, Aidlingen; Hans-Ludwig Jäger, Böblingen; Joachim Weisse, Herrenberg, all of Fed. Rep. of Germany

[73] Assignee: Daimler-Benz, Fed. Rep. of Germany

[21] Appl. No.: 402,536

[22] Filed: Sep. 5, 1989

[30] Foreign Application Priority Data

Sep. 3, 1988 [DE] Fed. Rep. of Germany ....... 3829968

[51] Int. Cl.⁵ .......................... B25G 3/00; F10D 1/00
[52] U.S. Cl. .................................... 403/287; 403/286; 403/301; 277/189
[58] Field of Search .................. 277/189, 12; 403/287, 403/301, 286

[56] References Cited

U.S. PATENT DOCUMENTS 4,310,164  1/1982  Mesnel ............................. 277/189
4,667,966  5/1987  Oehrle ........................... 277/189 X Primary Examiner—Andrew V. Kundrat
Attorney, Agent, or Firm—Evenson, Wands, Edwards, Lenahan & McKeown

[57] ABSTRACT

A seal arrangement for connecting two seals in a fluid-tight and mechanically robust connection without vulcanization or adhesive bonding. The seal connector is provided with a sleeve-shaped receiver on one end of one seal for receiving an end of the other seal. The two seals are further releasably connected to one another by a lug on the connector which fits around the other seal.

7 Claims, 3 Drawing Sheets

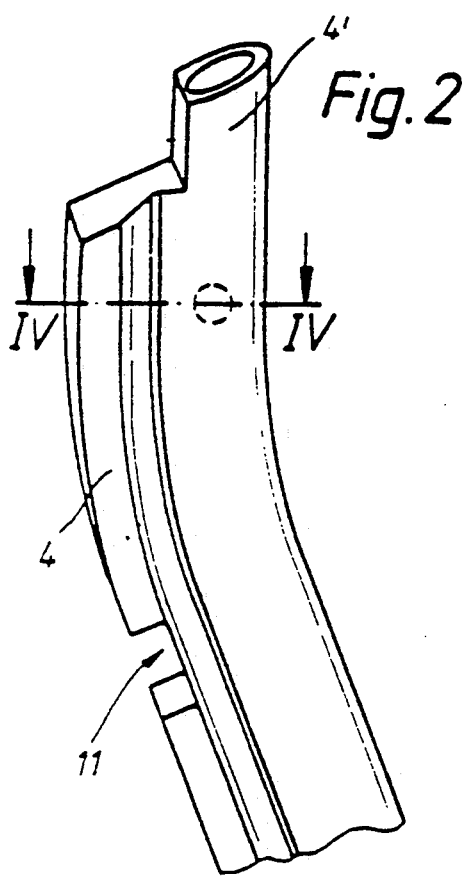
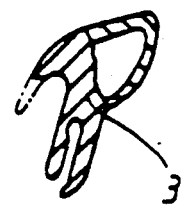
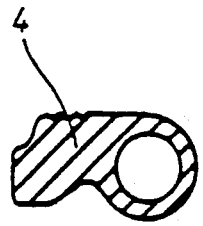
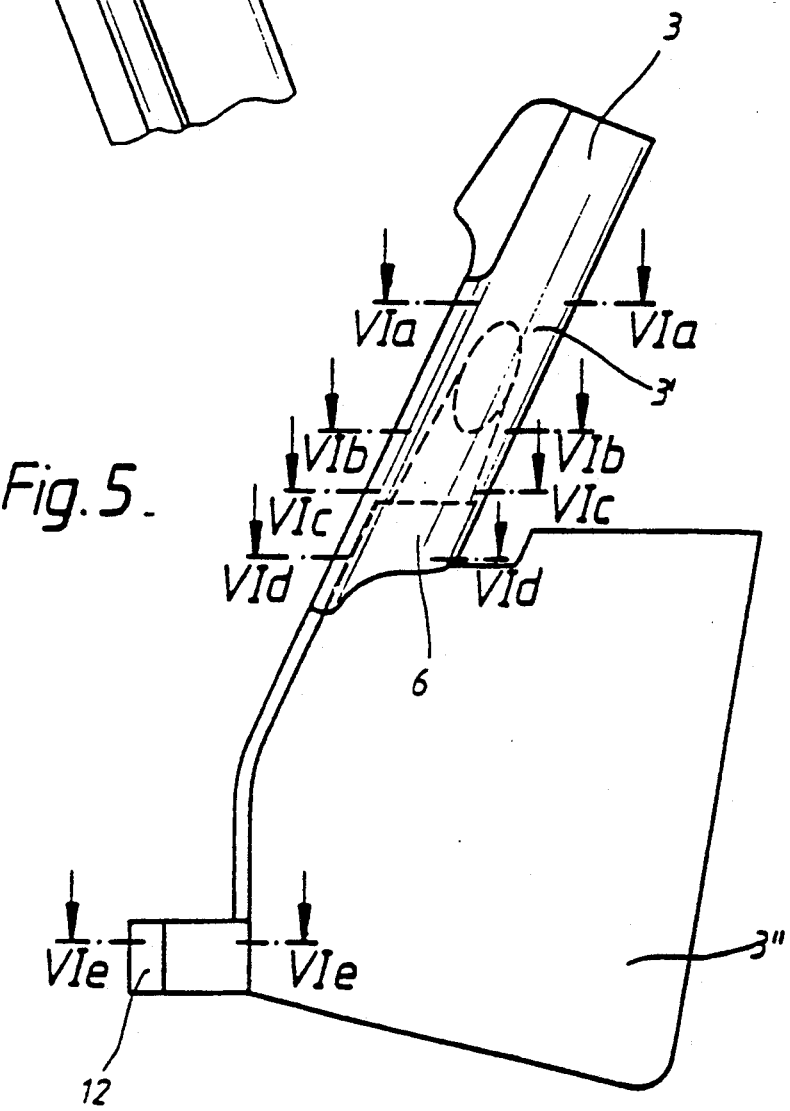

SEAL ARRANGEMENT FOR CONNECTING SEALS

BACKGROUND AND SUMMARY OF THE INVENTION

The invention relates to a seal arrangement for connecting two seals with different seal profiles, comprising a transition connection piece which is arranged between respective end regions of the two seals and to which the ends are fixed.

Seal elements which are used in the motor vehicle industry have such large dimensions that handling and storage is difficult. For this reason, dividing places are provided for the seals so that the seals rest against one another at their end faces and are connected to one another. Seals of this kind can be connected in a variety of ways. It is customary to connect the seals to one another by vulcanization or cold bonding. If hollow profile seals are used, it is known that the seals can be matched to one another in such a way that it is possible to fit them together loosely.

In many cases, it is necessary to connect seals of different types to one another. Quite often these seals have different cross-sections. This results in joints which are aesthetically disadvantageous and which provide for a loose fitting and hence an inadequate connection. For this reason, vulcanizing or cold-bonding methods are used in the assembly of the seals. In conveyor line assembly these methods lead to a delay.

German Offenlegungsschrift 3,729,179 provides a seal with a transition piece, arranged between the end regions of the seal for connecting these seal ends. Receivers for the end regions of the seal are arranged on the transition piece. The seal, which is designed with a cavity, is pushed onto the receivers of the transition piece. In this embodiment, there is a non-positive connection between the end region of the seal and the receiver of the transition piece. Relatively large connection surfaces are available between the seal ends and the receivers of the transition piece. The seal ends of the seal are adhesively bonded to the receivers of the transition piece by means of a bonding agent.

The object on which the present invention is based is to design a seal arrangement of the above general type in such a way that a robust connection of the seal is achieved and the assembly of the seal arrangement is simplified. In particular the seal arrangement does not require adhesive bonding and vulcanizing operations during assembly.

This object is achieved by having a transition piece fixedly connected to the first seal and connected releasably to the second seal. The transition piece has a sleeve-shaped receiver designed as sealing surface for releasably receiving an end of the other seal and an accurately fitting lug engaging in an accurately fitting recess in the other seal when the seals are connected.

The seal arrangement provides that a sleeve-shaped receiver for the second seal is formed on one seal and that the two seals are connected to one another releasably via a lug connection which fits accurately with respect to the joining contact point of the seal ends The seals, resting against one another at their end faces, can thus be connected to one another with an accurate fit without vulcanizing or adhesive bonding operations. This is of advantage in the case of conveyor line assembly. Compared to the loose fitting together of the two seals, the accurately fitting lug connection guarantees that the seals do not spring apart even in the case of high stressing. The gap formed at the contact point between the two seals is covered over fluid-tightly by the sleeve-shaped receiver.

The sleeve-shaped receiver is preferably designed as a thin-walled, resilient tube which is provided with a longitudinal opening for surrounding and engaging the sealing surface of the second seal. A seal arrangement designed in this way is aesthetically advantageous since an almost flush transition between the two seals is achieved.

An advantageous method of securing the tubular receiver is obtained by a fixed securing rail, the flange of which engages around a foot part of the second seal. The flange is provided in the region of the lug connection. The receiver can be secured between the seals and by a lip formed on the receiver which is located between a flange of a securing rail and the second seal. The securing rail serves to accommodate a foot part of the second seal. No additional parts are necessary for securing the covering part.

An advantageous embodiment of the invention provides that the first seal is designed as an outer window-channel seal of a side door of a motor vehicle. The receiver and the part provided with the lug are arranged as a vulcanization molded part on one seal and provided at each of the front ends of the window-channel seal. The molded part is furthermore equipped with fixing parts for fixing on the side door. This molded part is vulcanized on the door-channel seal during production. By such an arrangement, no vulcanization work is necessary during assembly and the contact point between the two seals is shifted out of a visible region on the vehicle.

It is advantageous if a portion of the molded part is designed as a solid profile, since stability is thereby increased.

The second seal can be designed as door-frame seal, the sealing surface of which is designed with a tubular hollow profile. At its front ends, the door-frame seal rests against the molded part of the first seal, designed as a window-channel seal and is connected to the first seal via the lug connections. The lug is arranged on the molded part to engage in a recess provided in a foot part of the door-frame seal. This recess is arranged to fit accurately relative to the contact point of the molded part and the door-frame seal. The gap arising at the contact point is covered and sealed off by the sleeve-shaped receiver arranged on the molded part.

Other objects, advantages and novel features of the present invention will become apparent from the following detailed description of the invention when considered in conjunction with the accompanying drawings.

BRIEF DESCRIPTION OF THE DRAWINGS

FIG. 2 shows a perspective representation of the second seal member according to FIG. 1, FIG. 3 shows the section of the first seal along the line III—III in FIG. 1.

FIG. 4 shows the section of the second seal along the line IV—IV according to FIG. 2, FIG. 5 shows a plan view of the molded connecting part according to FIG. 1, FIGS. 6a to e show the sections of the molded connecting part along the line VI—VI (a-e) respectively according to FIG. 5

DETAILED DESCRIPTION OF THE DRAWING

Figure 1:
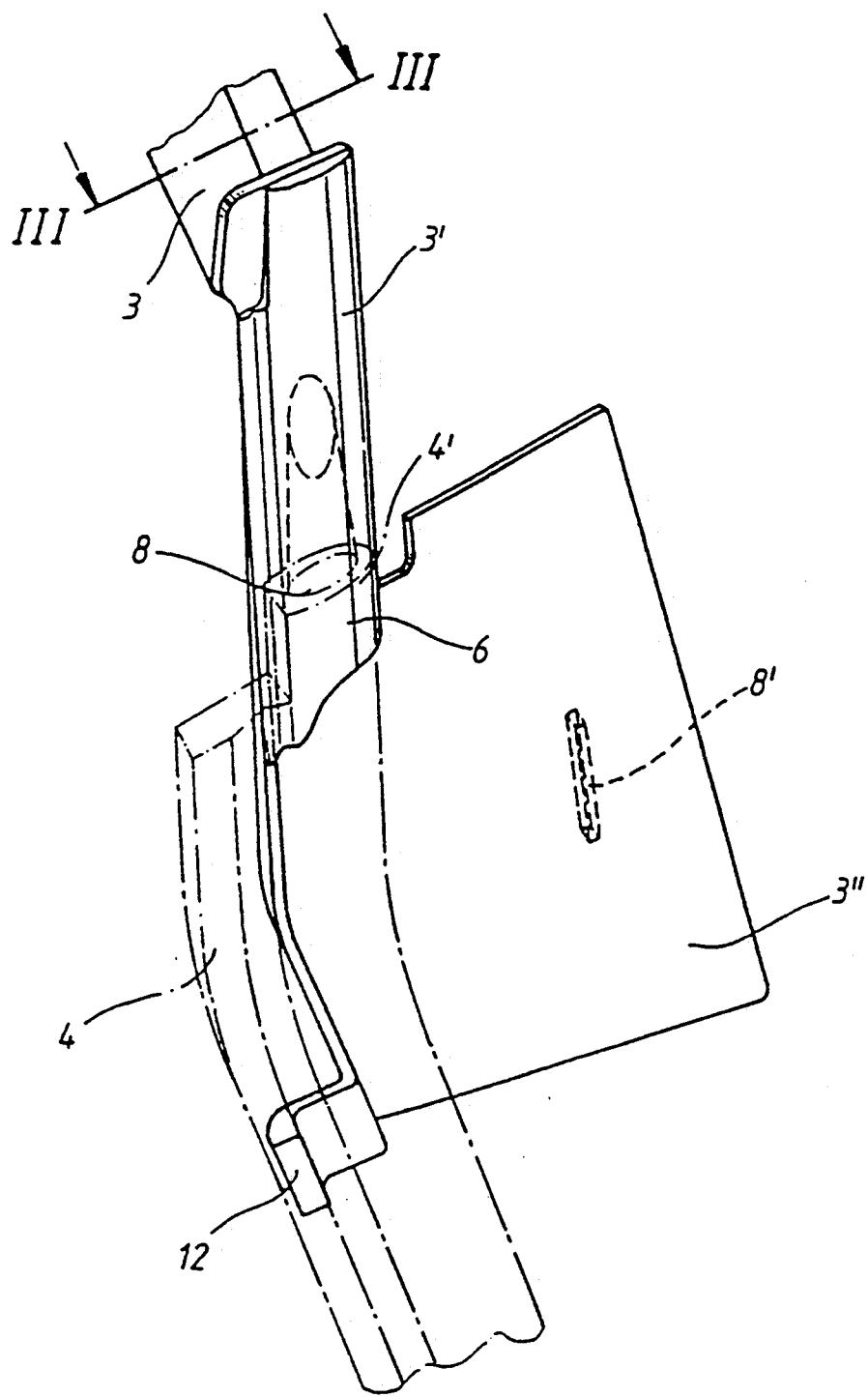
FIG. 1 shows a perspective representation of one embodiment of the invention showing the two seals and their connection.

FIG. 1 shows a perspective representation of a seal arrangement which is constructed from a first seal 3 and a second seal 4. The first seal 3 is designed as an outer window-channel seal of the side door of a motor vehicle and has a cross-section as illustrated in FIG. 3. A seal of this kind has a foot part which is secured in a corresponding receiver on the vehicle side door. The sealing surface of the window-channel seal 3 is designed as a hollow profile which rests against the side window pane. The second seal 4 is a door-frame seal of the side door of a motor vehicle (not illustrated) and is shown in perspective representation (FIG. 2).

The seal arrangement 3, 4 is envisaged for the side door of a coupe. Side doors of this kind do not have a window frame surrounding the side window when closed. Accordingly, the outer window-channel seal 3 is also only arranged at the upper edge of the side doors (not illustrated). The door-frame seal 4 is necessary for sealing the side doors with respect to the vehicle body. In principle, it is conceivable to design the two seals 3, 4 as one sealing component. However, this would give rise to a very large component (window-channel seal about 1000 mm long, door-frame seal about 2000 mm long). This would make both handling during assembly and storage more difficult. In order to avoid the disadvantages of vulcanization and adhesive bonding work during conveyor line assembly, the two seals 3, 4 are provided with a plug-in connection convenient for assembly.

According to FIG. 1 and FIG. 5, a molded connection part 3' is arranged almost perpendicular relative to the longitudinal axis of the first seal 3 and is provided at the end face of the first seal 3. The molded connection part 3' is vulcanized onto the seal 3 during the production of the latter. A sleeve-shaped receiver 6 for receiving a sealing part 4' of the second seal 4 is formed on the molded part 3'. An end face of the sealing part 4' rests at the contact point 8 in the receiver 6 of the molded connection part 3'. The length of the molded connection part 3' is selected so that the joint between the molded part 3' and the second seal 4 lies outside a visible region.

Figure 6A:
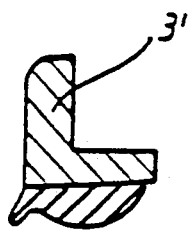
Figure 6B:
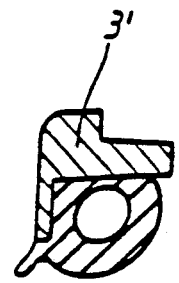
Figure 6C:
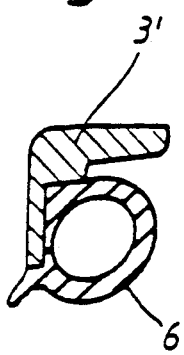
Figure 6D:
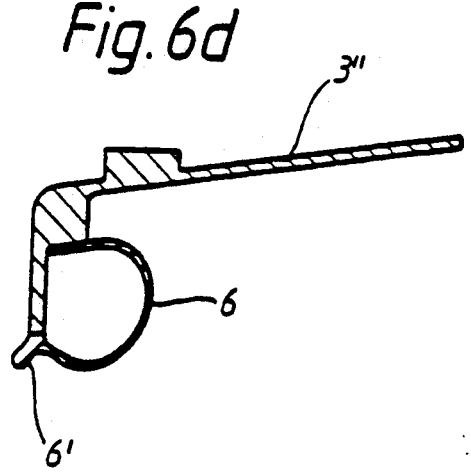
Figure 6E:
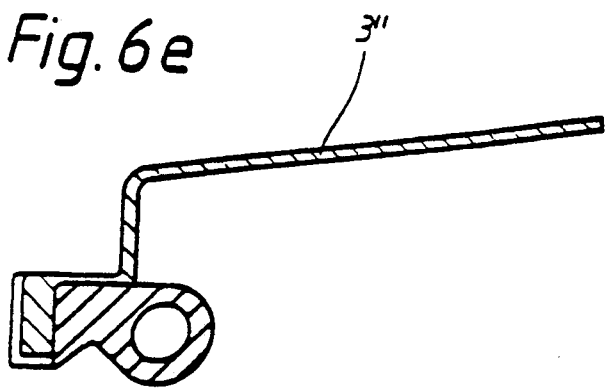

Cross-sections of the molded connection part 3' between the first seal 3 and the contact point 8 of the second seal 4 are illustrated in FIGS. 6a to 6c. The molded connection part 3' is formed with a sealing surface matched to the door-frame seal 4. In the region of the contact point 8 (FIG. 6d) the sealing part 4' is inclosed into the tubular receiver 6. On the receiver 6 there is a lip 6' which is used for attachment to a flange 7' of a securing rail 7 which is secured on the door panel 9 (FIG. 7).

The molded connection part 3' is connected to a plate-shaped part 3''. A securing projection 8' is provided on the part 3'' for fixing and/or centering the molded part 3' on the side doors. A lug 12 is formed in the region of the lower edge of the part 3''. The lug 12 engages in a recess 11 on the second seal 4. The recess 11 is made at a dimensionally fixed distance from the end of the second seal 4. An accurately fitting lug connection of the sealing parts is thereby achieved By means of the releasable plug-in connection, vulcanization or adhesive bonding work during assembly is made unnecessary. The lug connection is designed with an easily releasable catch arrangement.

Figure 7:
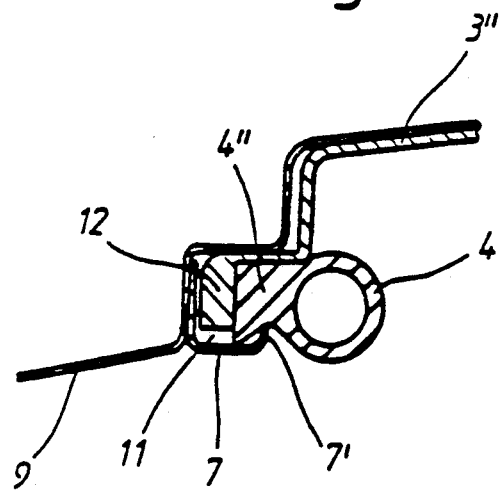
FIG. 7 shows a section through the second seal and molded connecting part at the level of the lug connection.

FIG. 7 illustrates a section through the seal arrangement in the assembled state on the side door in the region of the lug connection 11, 12. The lug 12 of the part 3'' engages in the recess 11 of the door-frame seal 4. The seal arrangement is fixed by means of a securing rail 7, which is secured on the door panel 9. A flange 7' formed on the securing rail 7 engages around the foot part 4'' of the second seal 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Sealing arrangement for connecting two seals with different seal profiles comprising:
   a transition connection means, which is arranged between respective end regions of the two seals for connection to the two seals;
   the transition connection means is fixedly connected to a first of the two seals and releasably connected to the second of the two seals;
   said connection means having a sleeve-shaped seal receiving portion designed as a sealing surface and an accurately fitting lug;
   said second of the two seals being releasably inserted into said receiving portion provided on the transition connection means; and
   wherein the lug engages in an accurately fitting recess in the second of said two seals when the said second of the two seals is so inserted.

2. Seal arrangement according to claim 1, wherein the receiver portion is designed as a thin-walled resilient tube which is provided with a longitudinal opening and surrounds an end sealing surface of the second seal which is inserted therein.

3. Seal arrangement according to claim 1, wherein there is a fixed securing rail means which has a flange to engage around a foot part of the second of said two seals in the region of the lug engagement.

4. Seal arrangement according to claim 2, wherein there is a fixed securing rail means which has a flange to engage around a foot part of the second of said two seals in the region of the lug engagement.

5. Seal arrangement according to claim 1, wherein the first of said two seals is designed as outer window-channel seal of a vehicle door and the second of said two seals is designed as a vehicle door-frame seal.

6. Seal arrangement according to claim 2, wherein the first of said two seals is designed as outer window-channel seal of a vehicle door and the second of said two seals is designed as a vehicle door-frame seal.

7. Seal arrangement according to claim 3, wherein the first of said two seals is designed as outer window-channel seal of a vehicle door and the second of said two seals is designed as a vehicle door-frame seal.

* * * * *